Patented July 28, 1931

1,816,286

UNITED STATES PATENT OFFICE

HANS JORDAN, OF BERLIN-STEGLITZ, GERMANY, ASSIGNOR TO THE FIRM: SCHERING-KAHLBAUM AKTIENGESELLSCHAFT, OF BERLIN, GERMANY

ALKYL-ISOPROPYLENE-PHENOLS AND PROCESS OF MAKING SAME

No Drawing. Application filed June 20, 1927, Serial No. 200,290, and in Germany June 29, 1926.

My invention refers to chemical products having valuable properties as starting materials for the manufacture of odorants and disinfectants, such products being obtained by decomposition of the products resulting in the condensation occurring at a temperature slightly above room temperature in the presence of gaseous hydrochloric acid between alkyl phenols and ketones as described in my copending application for patent of the United States filed of even date herewith Ser. No. 200,289 and entitled "Chemical products and process of making same". These products of condensation contain acylisable hydroxyl groups and probably have the constitution shown, for the product from m-cresol and acetone, by the following formula

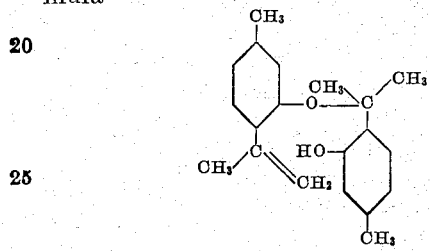

I have now ascertained that if these products are heated to 300° C., the components distill over in a quantitative manner and can be separated by fractional distillation. I prefer expediting the distilling of the components from the material heated to about 300° C. by slight evacuation, the degree of evacuation being chosen in such manner that the original product does not distill over.

*Example 1.*—The product of condensation from m-cresol and acetone described in my copending application above mentioned, if heated to about 300° C. is decomposed into its constituents, which distil over. From the distillate can be separated by fractional distillation the valuable compound 3-methyl-6-isopropylene phenol having the formula

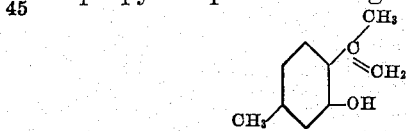

and boiling at 213–218° C.

*Example 2.*—The product of condensation from p-cresol and acetone described in my copending application is heated to 300–310° C., as described with reference to Example 1, and the components are distilled over. There is obtained by fractional distillation the compound 4-methyl-6-isopropylene phenol having the formula

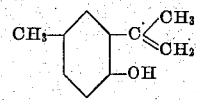

and boiling at 213–218° C.

*Example 3.*—The product of condensation from crude cresol, being a mixture of m- and p-cresol, and acetone, described in my copending application, is heated to about 300° C., when its constituents will distil over and can be separated by fractional distillation, resulting in the recovery of 3-methyl-6-isopropylene phenol and 4-methyl-6-isopropylene phenol, which appear to be constituted according to the formula

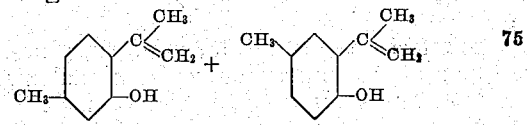

and boiling at 213–218° C.

The term "a cresol" in the claims is intended to mean m- and p-cresol. Various changes may be made in the details described in the foregoing specification without departing from the invention or sacrificing the advantages thereof.

I claim:—

1. The process of producing methylisopropylenephenols comprising heating to about 300° C. compounds resulting from the condensation, occurring at a temperature slightly above room temperature in the the presence of gaseous hydrochloric acid, of a cresol and acetone and which have the formula

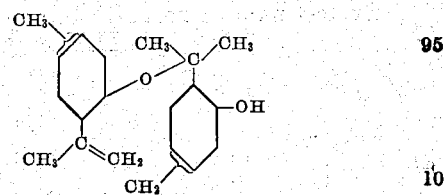

to effect decomposition, subjecting the products of decomposition to fractional distillation and collecting the fraction containing the methyl-isopropylenephenols.

2. The process of producing methylisopropylenephenols comprising heating to about 300° C. compounds resulting from the condensation, occurring at a temperature slightly above room temperature in the presence of gaseous hydrochloric acid, of crude cresol and acetone, the product being a mixture of compounds having the formulæ:

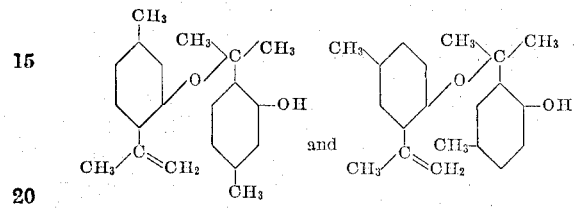

to effect decomposition, subjecting the products of decomposition to fractional distillation and collecting the fraction containing the methyl-isopropylenephenols.

3. The process of producing methylisopropylenephenols comprising heating in vacuo to about 300° C. compounds resulting from the condensation, occurring at a temperature slightly above room temperature in the presence of gaseous hydrochloric acid, of a cresol and acetone and which have the formula:

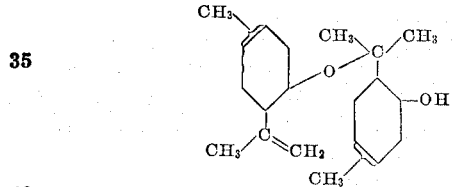

to effect decomposition, subjecting the products of decomposition to fractional distillation and collecting the fraction containing the methyl-isopropylenephenols.

4. As a new product the product obtainable by fractional distillation at about 300° C. of a mixture of compounds having the formulæ:

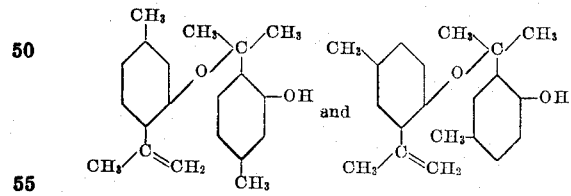

supposed to be a mixture of 3-methyl-6-isopropylenephenol and 4-methyl-6-isopropylenephenol.

In testimony whereof I affix my signature.

HANS JORDAN.